United States Patent
Kim et al.

(10) Patent No.: US 9,803,057 B2
(45) Date of Patent: Oct. 31, 2017

(54) METHOD FOR PREPARING MICROPOROUS POLYOLEFIN FILM BY THERMALLY-INDUCED PHASE SEPARATION METHOD

(71) Applicant: LG CHEM, LTD., Seoul (KR)

(72) Inventors: Bong-Tae Kim, Daejeon (KR); Heon-Sik Song, Daejeon (KR); Seung-Yup Lee, Daejeon (KR); Kyoung-Min Kim, Guri-si (KR)

(73) Assignee: LG CHEM, LTD., Seoul (KR)

( * ) Notice: Subject to any disclaimer, the term of this patent is extended or adjusted under 35 U.S.C. 154(b) by 18 days.

(21) Appl. No.: 14/444,530

(22) Filed: Jul. 28, 2014

(65) Prior Publication Data

US 2015/0018442 A1    Jan. 15, 2015

Related U.S. Application Data

(63) Continuation of application No. PCT/KR2013/000589, filed on Jan. 25, 2013.

(30) Foreign Application Priority Data

Jan. 26, 2012  (KR) .................. 10-2012-0007767

(51) Int. Cl.
  *C08J 5/18*  (2006.01)
  *C08L 23/02*  (2006.01)
  (Continued)

(52) U.S. Cl.
  CPC ............ *C08J 5/18* (2013.01); *B29C 47/0071* (2013.01); *C08L 23/02* (2013.01); *B29D 7/01* (2013.01);
  (Continued)

(58) Field of Classification Search
  CPC .............................. C08J 5/18; B29C 47/0021
  See application file for complete search history.

(56) References Cited

U.S. PATENT DOCUMENTS

| 4,247,498 A | 1/1981 | Castro |
| 4,659,754 A * | 4/1987 | Edwards ............ C08J 3/22 |
| | | 523/214 |

(Continued)

FOREIGN PATENT DOCUMENTS

| KR | 10-2006-0118668 A | 11/2006 |
| KR | 10-2008-0055061 A | 6/2008 |

(Continued)

OTHER PUBLICATIONS

Get Smart About Screens by Allan L. Griff, Consultant From: Plastics Technology Issue: Mar. 2004.*

(Continued)

*Primary Examiner* — Mike M Dollinger
*Assistant Examiner* — Christina Wales
(74) *Attorney, Agent, or Firm* — Rothwell, Figg, Ernst & Manbeck, P.C.

(57) ABSTRACT

The present invention discloses a method for preparing a microporous polyolefin film comprising: a step of injecting a composition comprising polyolefin 30 to 60 wt % and a diluent mixture comprising a diluent, which can make liquid-liquid phase separation with the polyolefin thermodynamically 40 to 70 wt %, into an extruding machine, and melting and kneading thereof to prepare a single phase melt; and a step of extruding the melt while conducting liquid-liquid phase separation by passing through a section having the temperature below the liquid-liquid phase separation temperature and forming thereof in the form of a sheet, and a microporous polyolefin film prepared according to the method.

5 Claims, 2 Drawing Sheets

(51) Int. Cl.
*B29C 47/00* (2006.01)
*B29D 7/01* (2006.01)
*B29L 7/00* (2006.01)

(52) U.S. Cl.
CPC ..... *B29L 2007/008* (2013.01); *C08J 2201/03* (2013.01); *C08J 2201/0522* (2013.01); *C08J 2323/02* (2013.01); *C08J 2323/06* (2013.01)

(56) References Cited

U.S. PATENT DOCUMENTS

| | | | | |
|---|---|---|---|---|
| 4,867,881 | A * | 9/1989 | Kinzer | ............ A61F 13/00008 210/490 |
| 5,849,001 | A * | 12/1998 | Torimae | ............ A61F 13/51401 428/315.5 |
| 2007/0015876 | A1* | 1/2007 | Inagaki | ............ C08J 5/18 525/240 |
| 2007/0092705 | A1 | 4/2007 | Lee et al. | |
| 2009/0087750 | A1 | 4/2009 | Takita et al. | |
| 2010/0041779 | A1* | 2/2010 | Lee | ............ C08J 5/18 521/64 |
| 2015/0031780 | A1* | 1/2015 | Kim | ............ C08J 9/283 521/79 |

FOREIGN PATENT DOCUMENTS

| | | | | |
|---|---|---|---|---|
| KR | 10-2010-0099405 A | | 9/2010 | |
| WO | WO 2013111982 A1 * | | 8/2013 | ............ C08J 9/283 |

OTHER PUBLICATIONS

Time to Learn About Dynamic Optimization of Extruder Barrel Temperatures by Chris Rauwendaal, President from Rauwendaal Extrusion Engineering Inc. From: Plastics Technology Issue: May 2008.*

Jarvas, G.; Quellet,C.; Dallos, A. Estimation of Hansen solubility parameters using multivariate nonlinear QSPR modeling with COSMO screening charge density moments. Fluid Phase Equilibria 309 (2011) 8-14.*

Levin, M.; Redelius, P. Determination of Three-Dimensional Solubility Parameters and Solubility Spheres for Naphthenic Mineral Oils. Energy & Fuels 2008, 22, 3395-3401.*

Table A.1 Hansen Solubility Parameters for Selected Solvents. Hansen Solubility Parameters: A Users Handbook. Charles M. Hansen CRC Press 1999 Print ISBN: 978-0-8493-1525-1.*

Younker, J.M.; Poladi, R.H.; Bendier, H.V.; Sunkara, H.B. Computational screening of renewably sourced polyalkylene glycol plasticizers for nylon polyamides. Polym. Adv. Technol. 2016, 273-280.*

International Search Report issued in International Application No. PCT/KR2013/000589 dated May 29, 2013, 2 pages.

* cited by examiner

US 9,803,057 B2

METHOD FOR PREPARING MICROPOROUS POLYOLEFIN FILM BY THERMALLY-INDUCED PHASE SEPARATION METHOD

CROSS-REFERENCE TO RELATED APPLICATION

This application is a continuation of International Application No. PCT/KR2013/000589 filed on Jan. 25, 2013, which claims priority under 35 USC 119(a) to Korean Patent Application No. 10-2012-0007767 filed in the Republic of Korea on Jan. 26, 2012, the disclosures of which are incorporated herein by reference.

TECHNICAL FIELD

The present invention relates to method for preparing a microporous polyolefin film, and a microporous polyolefin film according to the method.

BACKGROUND ART

A microporous polyolefin film is broadly used as various battery separators, separation filters, separation membranes for microfiltration and the like due to its chemical stability and excellent physical properties. A wet method of methods for preparing a microporous film from polyolefin is a method of making pores on the polyolefin by kneading the polyolefin with a diluent at high temperature to form a single phase, phase separating the polyolefin and the diluent during a cooling process, followed by extracting the diluent portion. It can produce a thin film with uniform thickness, and has excellent physical properties by stretching, thereby being broadly used as a separation membrane for a lithium ion secondary battery.

Methods for preparing a porous film by the wet method are classified into a solid-liquid phase separation method and a liquid-liquid phase separation method depending on that a polymer making up a film and the kneaded diluent are phase separated through which process to form pores. Both methods are identical up to the step of making a single phase by mixing the polymer and the diluent at high temperature, but different on phase separation mechanism. Accordingly, characteristics of the microporous films finally produced are different each other.

In the case of solid-liquid phase separation, the polymer is crystallized through cooling, and only the polymer is solidified. Accordingly, phase separation occurs as the diluent is removed between the polymer solid phases. In other words, the phase separation occurs as the diluent is pushed out of crystals during crystallization of polymer chains. Therefore, size of the generated phase-separated phase is very small, compared to the size of the polymer crystal, and there is a defect that the structure of the separated phase such as shape and size can't be controlled variously. In this case, there may be a limit to be applied as a secondary battery separation membrane having high transmittance required for a high performance, high output and long life time secondary battery, which is recently being developed at secondary battery manufacturers. As representative composition of the solid-liquid phase separation, a case mixing paraffin oil, mineral oil and paraffin wax to a polyolefin resin is widely known.

In the case of the liquid-liquid phase separation, a polymer in liquid state and a diluent in other liquid phase (partially immiscible) exist as a uniform single phase at the temperature over the liquid-liquid phase separation temperature, and after lowering the temperature, are phase separated by thermodynamic instability at the temperature over the polymer crystallizing temperature. Accordingly, shape, size and the like of the separated phase (droplet) are changed as the phase separation condition is changed. Thus, in the case of the liquid-liquid phase separation method, the temperature of the liquid-liquid phase separation and the size of the separated phase can be controlled according to a kind of a polymer (e.g.,: polymer molecular weight) and a combination of a diluent (e.g.,: solubility parameter), and also there may be the time for growth of the droplet by the liquid-liquid phase separation as much as the difference between the thermodynamic liquid-liquid phase separation temperature (cloud point) and the solid-liquid phase separation temperature. When manufacturing a membrane, a fast freezing process is conducted between a T-die of an extruding machine and a casting roll. Accordingly, the droplet size can be variously controlled depending on the temperature difference between the real temperatures conducting liquid-liquid phase separation and solid-liquid phase separation, and the retention time at the extruding step. In the case of the microporous film prepared by the liquid-liquid phase separation method, the pore size can be controlled unlike the microporous film by the solid-liquid phase separation method, and also a microporous film having the pore size several times larger than the pore size of the microporous film by the solid-liquid phase separation method can be prepared.

On the other hand, in order to use the liquid-liquid phase separation method, a diluent having the liquid-liquid phase separation condition (temperature), which is suitable to polymer processing conditions at the higher processing temperature, should be found.

U.S. Pat. No. 4,247,498 disclosed various combination of a polymer and a diluent, which can be liquid-liquid phase separated, and described that a product having a wide range of thickness can be produced by extracting the diluent from the liquid-liquid phase separated composition. U.S. Pat. No. 4,867,881 described an invention making a microporous film, which is oriented by stretching, extracting, drying and heat-setting a liquid-liquid phase separated composition.

Korean Patent No. KR20080055061A also described the combination ratio of a polymer and a diluent and the combination ratio of two diluent ingredients when processing and extruding.

Therein, kinds of the diluent, which can be used for preparation by the liquid-liquid phase separation were listed, and those were selected from the existing diluents suitable for liquid-liquid phase separation, listed in U.S. Pat. No. 4,247,498, based on manufacturing characteristics.

However, still it is needed to develop a microporous polyolefin film, wherein the pore size is effectively controlled by using a diluent having excellent liquid-liquid phase separation characteristics with polyolefin.

DISCLOSURE

Technical Problem

Accordingly, it is an object of the present invention to provide a method for preparing microporous polyolefin film by using an optimal novel diluent, which can have a liquid-liquid phase separation step according to control Hansen solubility parameter distance between polyolefin and a diluent mixture; and a microporous polyolefin film prepared by the above method, wherein the pore size of a separation membrane is controlled, and which can express high output and long life time characteristic in a secondary battery.

Technical Solution

In order to achieve the object, according to one aspect of the present invention, the present invention provides a method for preparing a microporous polyolefin film comprising:

(a) a step of injecting a composition comprising polyolefin 30 to 60 wt % and a diluent mixture 40 to 70 wt % into an extruding machine, and melting and kneading thereof to prepare a single phase melt, wherein the diluent mixture comprises a diluent, which can make liquid-liquid phase separation with the polyolefin thermodynamically and a supplementary diluent forming a thermodynamic single phase with the polyolefin, and weight ratio of the diluent and the supplementary diluent is 3:7 to 7:3; and (b) a step of extruding the melt while conducting liquid-liquid phase separation by passing through a section having the temperature below the liquid-liquid phase separation temperature and forming thereof in the form of a sheet, wherein Hansen solubility parameter distance (Ra), expressed by the following formula of the diluent mixture to the polyolefin is 4.0 to 6.5 $(J/cm^3)^{1/2}$:

$$Ra \quad (J/cm^3)^{1/2}=[4*(\delta D^P-\delta D^D)^2+(\delta P^P-\delta P^D)^2+(\delta H^P-\delta H^D)^2]^{1/2}$$

(wherein $\delta D^P$, $\delta P^P$ and $\delta H^P$ represent polyolefin solubility parameter generated by non-polar dispersion energy, polyolefin solubility parameter generated by polar energy by permanent dipole moment and polyolefin solubility parameter generated by energy by hydrogen bonds, respectively; and $\delta D^D$, $\delta P^D$ and $\delta H^D$ represent diluent solubility parameter generated by non-polar dispersion energy, diluent solubility parameter generated by polar energy by permanent dipole moment and diluent solubility parameter generated by energy by hydrogen bonds, respectively).

The diluent may comprise ester of trimethylolpropane or ester of triethyleneglycol.

The temperature difference (delta T) between a T-die of the extruding machine and a casting roll when extruding may be 120 to 160° C.

The supplementary diluent may comprise at least one selected from the group consisting of liquid paraffin, paraffin oil, mineral oil and paraffin wax.

The liquid-liquid phase separation may form uniform pore size by slowly lowering the temperature of the melt (T-die temperature) beyond a filter of the extruding machine to 200° C., and by controlling retention time.

Crystallinity may be increased and uniform pore size may be formed by lowering the temperature difference (delta T) between the T-die and the casting role of the extruding machine when extruding.

The method may further comprises steps of preparing a film by stretching the above formed sheet to prepare a film, extracting the diluent from the stretched film by using an organic solvent, drying the film, and heat-setting the dried film to prepare a microporous polyolefin film.

The method may further comprise a step of aging the prepared microporous polyolefin film.

According to another aspect of the present invention, a microporous polyolefin film prepared by the above method is provided.

ADVANTAGEOUS EFFECTS

According to one embodiment of the present invention, a microporous polyolefin film having excellent physical properties can be prepared by causing liquid-liquid phase separation of a diluent mixture containing a novel diluent making liquid-liquid phase separation and polyolefin during a extruding process by kneading and extruding the diluent mixture with the polyolefin. As a result, the obtained microporous polyolefin film can be usefully used to a battery separator and various filters.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Figure 1:
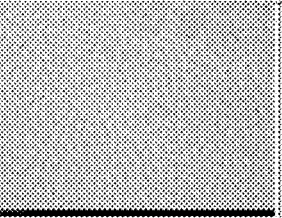
FIG. 1 is an image of the surface of a microporous polyolefin film obtained according to content change of paraffin oil and EBN.W in a diluent mixture.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A diluent (low molecular weight organic material) used to wet methods for preparing a microporous polyolefin film may be classified into two types: a diluent forming a single phase after polyolefin is melted, and passing through only solid-liquid phase separation when the polyolefin is cooled; and a diluent forming a single phase with the polyolefin only at a higher temperature region of a temperature region where the polyolefin is melted, and conducting liquid-liquid phase separation at the temperature below the phase separation temperature (cloud point).

In the solid-liquid phase separation method, there is miscibility between a polymer and a diluent due to its similar solubility parameter with the polymer. The diluent well interacts with polyolefin when thermodynamically mixing at high temperature, and therefore, well mixed and forms a stable mixture. Accordingly, it forms a single phase at high temperature, but when removing heat from the system, i.e., cooled, only diluent is removed by polymer solidification. A diluent following only the solid-liquid phase separation mechanism can control the pore size of a microporous film. A diluent used for the liquid-liquid phase separation has higher solubility parameter with a polymer, and accordingly, it is partially immiscible at high temperature. When kept at the temperature over the phase separation temperature (cloud point), a single phase of a polymer and a diluent is formed. When mixing at the single phase-formed temperature followed by extruding by considering the liquid-liquid phase separation-occurring temperature, a microporous film having the desired pore size by the liquid-liquid phase separation can be obtained.

Liquid-liquid phase separation method consists of a polymer rich phase and a diluent rich phase comprising polyolefin and a diluent. Droplets of the thermodynamically phase-separated diluent rich phase become larger with time by coarsening action, which is combining droplets by diffusion, and it accounts for the pore size when extracting. The degree of enlargement of the phase-separated phase by the coarsening action may vary according to the retention time at the liquid-liquid phase separation state and the temperature where the liquid-liquid phase separation state is kept. Namely, as the retention time is longer and the difference between the temperature where the liquid-liquid phase separation occurs and the temperature where the liquid-liquid phase separation is actually proceeded is bigger, the size of each phase becomes larger. Or, it goes through a particle growth (Oswald-ripening) process forming one droplet by combining two droplets.

The increase of the size of each phase continues until the temperature of the melt is lowered to the temperature below the crystallization temperature of the polyethylene rich phase, and thereby the polymer rich phase is crystallized. For these reasons, the method for preparing a microporous polyolefin film by the liquid-liquid phase separation method can control the size of the separated phase unlike the method by the solid-liquid phase separation method. Namely, the size of the phase can be variously controlled according to the difference between the thermodynamic liquid-liquid phase separation temperature and the temperature where the phase separation is actually proceeded, and the retention time at each step. Accordingly, unlike the microporous film by the solid-liquid phase separation method, the microporous film prepared by the liquid-liquid phase separation method can control the pore size, and it is also possible to prepare a microporous film having larger pore size several times or more, compared with the pore size of the microporous film by the solid-liquid phase separation method. Actually, because the film is prepared by fast freezing when extruding, the mixability can be predicted by considering the solubility parameter with polyolefin, and droplets having the desired size can be formed by considering the solubility parameter difference with polyolefin.

At this time, general proper processing temperature may be 200 to 250° C. A novel diluent, which satisfies the above conditions, and thermal stability and commercial safety at the same time, was selected. Further, economics on the diluent was also considered.

The present invention is characterized that pore size of the microporous film can be freely controlled by controlling Hansen solubility parameter distance (Ra) between a diluent mixture containing a novel diluent and polyolefin.

The method for preparing a microporous polyolefin film according to one aspect of the present invention comprises:
(a) a step of injecting a composition comprising polyolefin 30 to 60 wt % and a diluent mixture 40 to 70 wt % into an extruding machine, and melting and kneading thereof to prepare a single phase melt, wherein the diluent mixture comprises a diluent, which can make liquid-liquid phase separation with the polyolefin thermodynamically and a supplementary diluent forming a thermodynamic single phase with the polyolefin, and weight ratio of the diluent and the supplementary diluent is 3:7 to 7:3; and (b) a step of extruding the melt while conducting liquid-liquid phase separation by passing through a section having the temperature below the liquid-liquid phase separation temperature and forming thereof in the form of a sheet, wherein Hansen solubility parameter distance (Ra), expressed by the following formula of the diluent mixture to the polyolefin is 4.0 to 6.5 $(J/cm^3)^{1/2}$:

$$Ra \ (J/cm^3)^{1/2} = [4*(\delta D^P - \delta D^D)^2 + (\delta P^P - \delta P^D)^2 + (\delta H^P - \delta H^D)^2]^{1/2}$$

(wherein $\delta D^P$, $\delta P^P$ and $\delta H^P$ represent polyolefin solubility parameter generated by non-polar dispersion energy, polyolefin solubility parameter generated by polar energy by permanent dipole moment and polyolefin solubility parameter generated by energy by hydrogen bonds, respectively; and $\delta D^D$, $\delta P^D$ and $\delta H^D$ represent diluent solubility parameter generated by non-polar dispersion energy, diluent solubility parameter generated by polar energy by permanent dipole moment and diluent solubility parameter generated by energy by hydrogen bonds, respectively).

Further, the method for preparing a microporous polyolefin film may further comprises steps of preparing a film by stretching the above formed sheet to prepare a film, extracting the diluent from the stretched film by using an organic solvent, drying the film, and heat-setting the dried film to prepare a microporous polyolefin film.

Further, it may further comprise a step of aging the prepared microporous polyolefin film. At this time, the step of aging may be conducted, for example, for 24 hours at the temperature of 50 to 80° C.

The polyolefin may be polyethylene such as high-density polyethylene, linear low-density polyethylene, low-density polyethylene and ultrahigh molecular weight polyethylene, polypropylene, polybutylene, polypentene, polyvinylidene fluoride (PVDF), Polymethylmethacrylate (PMMA), or a mixture thereof.

Of them, the high-density polyethylene having high crystallinity and low melting point of a resin is the most preferable. Molecular weight of the polyolefin is not critical if it is possible to be formed in the form of a sheet, but higher molecular weight may be more preferred in the case of a use requiring strong physical properties, for example, a separation membrane for a secondary battery. In this case, the weight average molecular weight may be $1 \times 10^5$ to $1 \times 10^6$, preferably, and $2 \times 10^5$ to $5 \times 10^5$, more preferably.

Total Hansen solubility parameter of the diluent may be higher than that of the polyolefin.

For example, the diluent may comprise ester of trimethylolpropane or ester of triethyleneglycol.

The ester of trimethylolpropane may be BET (LG chem, Ltd), and specifically, the BET comprises trimethylolpropane tri(2-ethylhexanoate) (the following chemical formula A), trimethylolpropane (2-ethylhexanoate)benzoate (the following chemical formula B), trimethylolpropane (2-ethylhexanoate)dibenzoate (the following chemical formula C) and trimethylolpropane tribenzoate (the following chemical formula D), and composition ratio of A:B:C:D may be 24±5:43±5:25±5:4±5.

A schematic synthesis process and chemical formulas of the compounds are as follows:

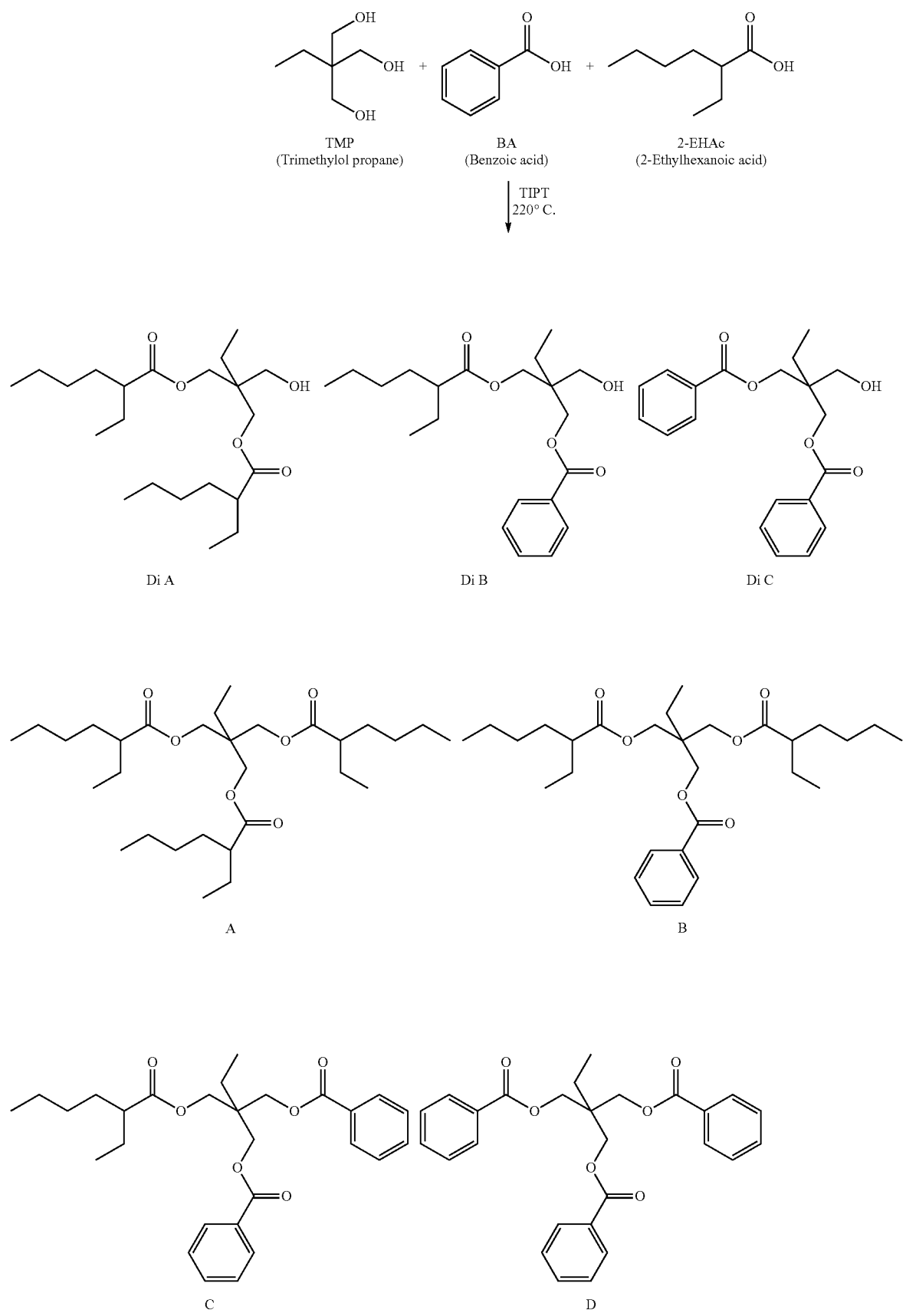

The ester of triethyleneglycol may be EBN.W (LG chem, Ltd), and specifically, the EBN.W comprises triethylene glycol di(2-ethylhexanoate) (the following chemical formula A), tri-ethylene glycol (2-ethylhexanoate)benzoate (the following chemical formula B) and tri-ethylene glycol dibenzoate (the following chemical formula C), and composition ratio of A:B:C may be 45±5:43±5:9±3.

A schematic synthesis process and chemical formulas of the compounds are as follows:

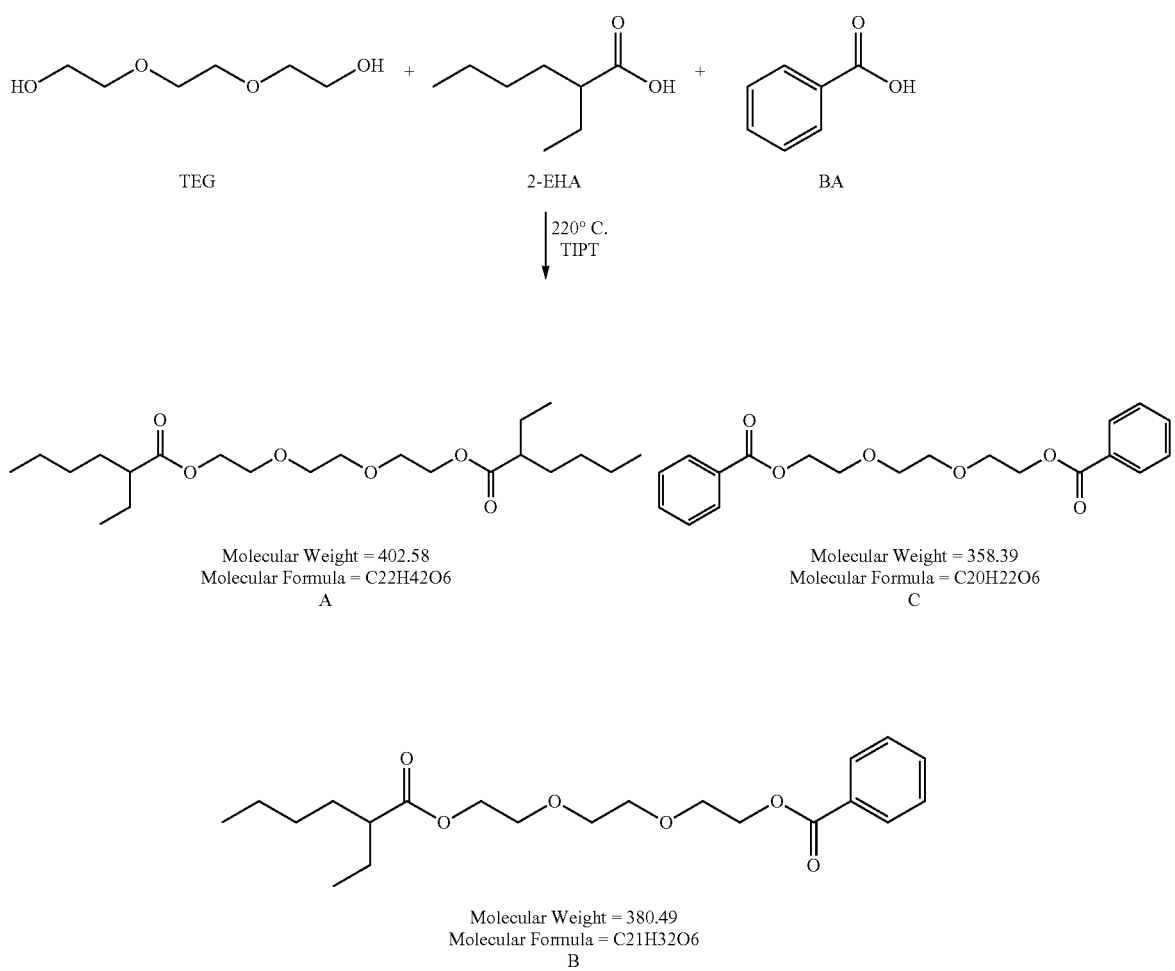

Reducing the temperature difference (delta T) between a T-die of an extruding machine and a casting roll when extruding is beneficial to enhancing crystallinity of the microporous polyolefin film and forming uniform pore size. Accordingly, the temperature difference may be controlled to, for example, 120 to 160° C. At this time, the temperature of the T-die may be 200° C., and the temperature of the casting roll (touch roll) may be 40 to 80° C.

The supplementary diluent forming a single phase may be any organic liquid compound, which thermodynamically forms a single phase with the polyolefin at the entire temperature region where the polyolefin is melted, i.e., not liquid-liquid phase separated with the polyolefin. When considering stability and safety of the process, the supplementary diluent may be an inert organic material such as liquid paraffin, paraffin oil, mineral oil or paraffin wax, preferably. It may be one or a mixture of two or more.

Weight ratio of the diluent to the supplementary diluent may be 3:7 to 7:3. If the weight ratio is less than 3:7, the phase separation temperature may become too low, and the pore size of the microporous polyolefin film, which will be obtained later, may become too large. When the weight ratio is over 7:3, the phase separation temperature may become too high, and the diluent may be insoluble against the polyolefin and mixibility may be deteriorated, thereby the phase separation behavior may not occur.

Further, the liquid-liquid phase separation is conducted by slowly lowering the temperature of the melt beyond a filter of an extruding machine (T-die temperature) to 200° C., and controlling the retention time, thereby forming uniform pore size. For example, the temperature of a mixing zone of the extruding machine is 220° C., and the T-die temperature of the extruding machine (the temperature of the melt) is lowered to 200° C.

In case of need, the composition may further comprise general additives for enhancing specific functions such as an oxidation stabilizer, a UV stabilizer, an antistatic agent, a nucleating agent.

Whether the polyolefin and the diluent are kneaded each other and form a single phase, or not may be predicted through Hansen solubility parameter in advance.

The Hansen solubility parameter was developed by Charles Hansen as a way of predicting if one material will dissolve in another material and form a solution.

In general, for calculating the solubility parameter, cohesive energy should be calculated. In the Hansen solubility parameter, the cohesive energy affects to the solubility parameter are represented the following parameters subdivided by three energies:

$\delta D$: solubility parameter $(J/cm^3)^{1/2}$ generated by non-polar dispersion energy $\delta P$: solubility parameter $(J/cm^3)^{1/2}$ generated by polar energy by permanent dipole moment $\delta H$: solubility parameter $(J/cm^3)^{1/2}$ generated by energy by hydrogen bonds These three parameters can be treated as coordinates for a point in three dimensions also known as the Hansen space.

Total Hansen solubility parameter ($\delta$Tot), the sum of these three Hansen solubility parameters, is defined as follows:

$$\delta Tot = (\delta D^2 + \delta P^2 + \delta H^2)^{1/2}$$

Namely, the Hansen solubility parameters (HSP) represent vectorial properties having the above three factors, and the Total Hansen solubility parameter ($\delta$Tot) represents magnitude of the vector.

Each Hansen solubility parameter (HSP) of a diluent, $\delta D$, $\delta P$ and $\delta H$, can be calculated by a program called HSPiP (Hansen Solubility Parameters in Practice), which was developed by using a group of the Doctor Charles Hansen propose the Hansen solubility parameter for the first time.

Further, Ra represents the distance between Hansen solubility parameters (HSP) of two materials, and means the difference on similarity between the two materials. The larger Ra means the lower similarity between the two materials.

If suppose that each Hansen solubility parameter (HSP) of two materials, A and B, are as follows:

$$HSPA = (\delta D^A, \delta P^A, \delta H^A)$$

$$HSPB = (\delta D^B, \delta P^B, \delta H^B)$$

The Ra can be calculated as follows:

$$Ra = [4*(\delta D^A - \delta D^B)^2 + (\delta P^A - \delta P^B)^2 + (\delta H^A - \delta H^B)^2]^{1/2}$$

The following Table 1 shows the calculated Hansen solubility parameters and Ra when using HDPE as polyolefin, EBN.W as a diluent, and paraffin oil as a supplementary diluent, and the calculated Hansen solubility parameters and Ra according to change the content ratio of a diluent mixture, respectively.

TABLE 1

| | Ingredient Name | $\delta D$ $(J/cm^3)^{1/2}$ | $\delta P$ $(J/cm^3)^{1/2}$ | $\delta H$ $(J/cm^3)^{1/2}$ | $\delta Tot$ $(J/cm^3)^{1/2}$ | Ra $(J/cm^3)^{1/2}$ |
|---|---|---|---|---|---|---|
| Polyolefin | HDPE (Mw = 5 × 10⁵) | 17.2 | 4.0 | 0.0 | 17.7 | 0.0 |
| Diluent | EBN.W | 16.9 | 5.6 | 7.2 | 19.2 | 7.4 |
| Supplementary Diluent | Paraffin Oil | 16.5 | 1.2 | 1.4 | 16.6 | 3.4 |
| Diluent Mixture-Paraffin Oil:EBN.W (Weight Ratio) | | | | | | |
| 1ˢᵗ Region | 9.5:0.5 | 16.5 | 1.5 | 1.8 | 16.7 | 3.4 |
| | 9:1 | 16.6 | 1.8 | 2.2 | 16.8 | 3.3 |
| | 8.5:1.5 | 16.6 | 2.1 | 2.5 | 16.9 | 3.4 |
| | 8:2 | 16.6 | 2.3 | 2.9 | 17.0 | 3.6 |
| 2ⁿᵈ Region | 7:3 | 16.6 | 2.8 | 3.6 | 17.3 | 4.0 |
| | 6:4 | 16.7 | 3.3 | 4.2 | 17.5 | 4.4 |
| | 5:5 | 16.7 | 3.7 | 4.8 | 17.8 | 4.9 |
| | 4:6 | 16.8 | 4.2 | 5.3 | 18.1 | 5.4 |
| | 3:7 | 16.8 | 4.6 | 5.8 | 18.4 | 5.9 |
| 3ʳᵈ Region | 2:8 | 16.8 | 4.9 | 6.3 | 18.6 | 6.4 |
| | 1.5:8.5 | 16.9 | 5.1 | 6.5 | 18.8 | 6.6 |
| | 1:9 | 16.9 | 5.3 | 6.8 | 18.9 | 6.9 |
| | 0.5:9.5 | 16.9 | 5.4 | 7.0 | 19.1 | 7.2 |

Referring to the above Table 1, the 1ˢᵗ region having very low EBN.W content in the diluent mixture shows a tendency that the solubility in the HDPE as polyolefin was getting better, like the paraffin oil-only case, according to the slow increase of the EBN.W content. Then, the 2ⁿᵈ region shows a tendency that the solubility was still good according to the increase of the EBN.W content, but the solubility in the HDPE was lower than the paraffin oil-only case according to the increase of Ra value. Further, the 3ʳᵈ region having the highest EBN.W content in the diluent mixture show a tendency that the diluent mixture was insoluble in the HDPE according to the increase of the EBN.W content.

The following Table 2 shows the calculated Hansen solubility parameters and Ra when using the HDPE (Mw=5×10⁵) as polyolefin, BET as a diluent, and paraffin oil as a supplementary diluent, and the calculated Hansen solubility parameters and Ra according to change the content ratio of a diluent mixture, respectively.

TABLE 2

|  | Ingredient Name | $\delta D$ $(J/cm^3)^{1/2}$ | $\delta P$ $(J/cm^3)^{1/2}$ | $\delta H$ $(J/cm^3)^{1/2}$ | $\delta Tot$ $(J/cm^3)^{1/2}$ | Ra $(J/cm^3)^{1/2}$ |
|---|---|---|---|---|---|---|
| Polyolefin | HDPE (Mw = 5 × 10$^5$) | 17.2 | 4.0 | 0.0 | 17.7 | 0.0 |
| Diluent | BET | 17.1 | 4.6 | 8.2 | 19.5 | 8.2 |
| Supplementary Diluent | Paraffin Oil | 16.5 | 1.2 | 1.4 | 16.6 | 3.4 |
| Diluent Mixture-Paraffin Oil:BET (Weight Ratio) | | | | | | |
| 1$^{st}$ Region | 9.5:0.5 | 16.5 | 1.4 | 1.8 | 16.7 | 3.5 |
|  | 9:1 | 16.6 | 1.6 | 2.1 | 16.8 | 3.4 |
|  | 8.5:1.5 | 16.6 | 1.8 | 2.5 | 16.9 | 3.5 |
|  | 8:2 | 16.6 | 1.9 | 2.9 | 17.0 | 3.8 |
| 2$^{nd}$ Region | 7:3 | 16.7 | 2.3 | 3.6 | 17.2 | 4.1 |
|  | 6:4 | 16.8 | 2.6 | 4.3 | 17.5 | 4.6 |
|  | 5:5 | 16.8 | 3.0 | 5.0 | 17.8 | 5.2 |
|  | 4:6 | 16.9 | 3.3 | 5.6 | 18.1 | 5.7 |
|  | 3:7 | 16.9 | 3.6 | 6.3 | 18.4 | 6.3 |
| 3$^{rd}$ Region | 2:8 | 17.0 | 4.0 | 6.9 | 18.8 | 6.9 |
|  | 1.5:8.5 | 17.0 | 4.1 | 7.3 | 19.0 | 7.3 |
|  | 1:9 | 17.0 | 4.3 | 7.6 | 19.1 | 7.6 |
|  | 0.5:9.5 | 17.1 | 4.4 | 7.9 | 19.3 | 7.9 |

Referring to the above Table 2, the 1$^{st}$ region having very low BET content in the diluent mixture shows a tendency that the solubility in the HDPE was excellent, like the paraffin oil-only case. Then, the 2$^{nd}$ region shows a tendency that the solubility was still good according to the increase of the BET content, but the solubility in the HDPE was lower than the paraffin oil-only case according to the increase of Ra value. Further, the 3$^{rd}$ region having the highest BET content in the diluent mixture show a tendency that the diluent mixture was insoluble in HDPE.

Referring to the above Tables 1 and 2, the 2$^{nd}$ region can embody the liquid-liquid phase separation considering the mixability and interaction with the HDPE. Further, the preparation of a microporous film using a diluent mixture and polyolefin of the above condition is easy to process, and beneficial to control the pore size.

FIG. 1 shows an image (at 140° C., ×400) of the surface of a microporous polyolefin (Mw=5×10$^5$) film obtained according to the content ratio (weight ratio) change of a diluent (EBN.W) and a supplementary diluent (paraffin oil) in a diluent mixture. At this time, the weight ratio of the polyolefin to the diluent mixture is 35:65.

Referring to FIG. 1, when the weight ratio of the diluent and the supplementary diluent in the diluent mixture is 8:2, the diluent mixture is insoluble to the polyolefin due to high content of the diluent. And then, at the weight ratio of 7:3, 6:4 and 5:5, the phase separation phenomenon of homogenous and fine droplets is observed, and at the weight ratio of 4:6, the phase separation is difficult to be confirmed.

Figure 2:
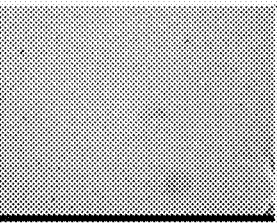
FIG. 2 is an image of the surface of a microporous polyolefin film obtained according to content change of paraffin oil and BET in a diluent mixture.

FIG. 2 shows an image (at 140° C., ×400) of the surface of a microporous polyolefin (Mw=5×10$^5$) film obtained according to the content ratio (weight ratio) change of a diluent (BET) and a supplementary diluent (paraffin oil) in a diluent mixture. At this time, the weight ratio of the polyolefin to the diluent mixture is 35:65.

Referring to FIG. 2, when the weight ratio of the diluent and the supplementary diluent in the diluent mixture is 10:0, i.e., the diluent only, and weight ratio is 8:2, i.e., very high diluent content, the diluent mixture is insoluble to the polyolefin. And then, at the weight ratio of 7:3, 6.5:3.5 and 6:4, the phase separation phenomenon of homogenous and fine droplets is observed, and at the weight ratio of 5:5, the phase separation is difficult to be confirmed.

Figure 3:
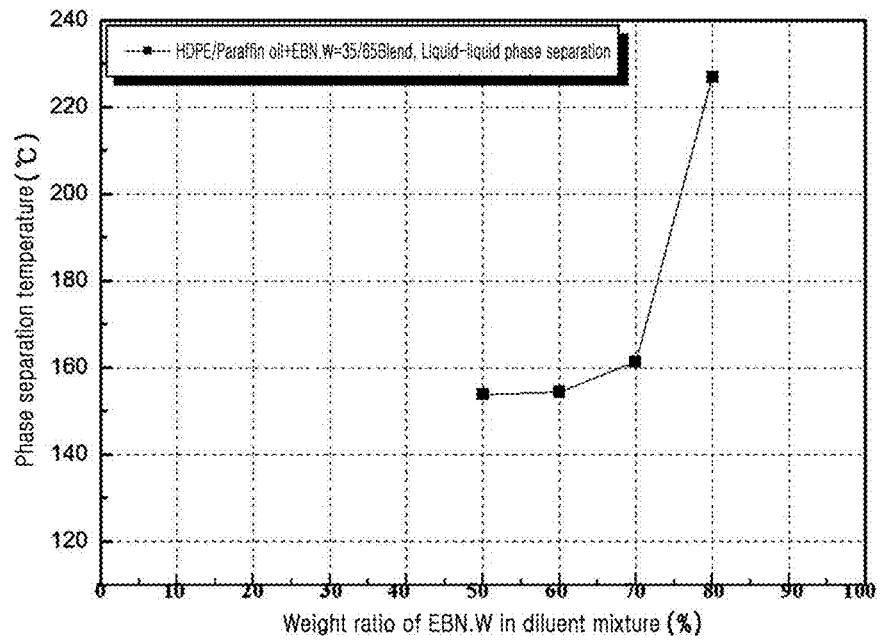
FIG. 3 is a graph showing the liquid-liquid phase separation temperature of a mixture of HDPE and a diluent mixture according to content ratio of EBN.W in the diluent mixture.
Figure 4:
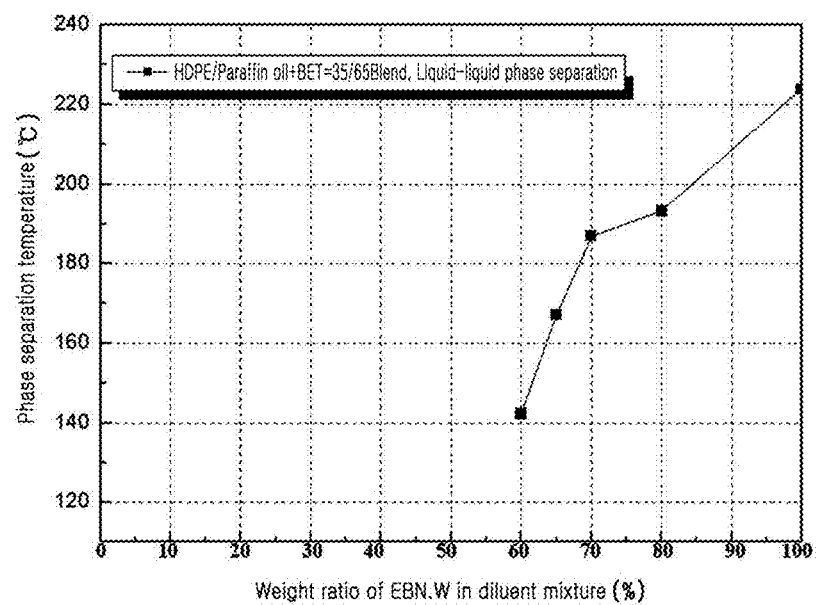
FIG. 4 is a graph showing the liquid-liquid phase separation temperature of a mixture of HDPE and a diluent mixture according to content ratio of BET in the diluent mixture.

FIG. 3 is a graph showing the liquid-liquid phase separation temperature of a mixture of the HDPE and the diluent mixture according to content ratio of EBN.W in the diluent mixture, and FIG. 4 is a graph showing the liquid-liquid phase separation temperature of a mixture of the HDPE and the diluent mixture according to content ratio of BET in the diluent mixture.

Before measuring the phase separation temperature, the composition comprising the polyolefin and the diluent mixture was obtained by melting-blending by using a HAAKE mixer at 230° C. for 10 min, and the then the composition was immediately cooled in a refrigerator.

The bimodal cloud point (phase separation temperature) curve was measured from an experiment using a thermo-optical microscopy.

At this time, the cloud point and crystallization temperature (Tc) were measured according to a method reported by S. S Kim et al (Polymer, Volume 33, Issue 5, 1992, Pages 1047-1057).

In this method, a thin sample of the polymer-diluent mixture was located between two microscope slide cover slips, and sealed with 100 μm-thick Teflon tape and grease so as to prevent evaporation of the diluent. Then, it was placed on Linkam THMS500 hot stage, and heated to 230° C.

After 20 to 30 sec, the cover slips were softly compressed to broaden the sample, so as to form the sample as thin as possible. In order to check the uniformity of the melt, it was kept at 230° C. for 1 min, and then the cover slip assembly was cooled to 100° C. at the rate of 10° C./min.

While the sample was cooled at the rate of 10° C./min up to final 100° C., light was irradiated to the sample, and the intensity of the transmitted light was monitored.

This experiment was conducted with unpolarized light of wavelength 538 nm. When the liquid-liquid phase separation occurred, the intensity of the transmitted light was reduced. Onset of this signal change was used as an indicator of onset of the liquid-liquid phase separation.

FIG. 3 is a graph showing the liquid-liquid phase separation temperature of a mixture of the HDPE and the EBN.W according to content ratio of EBN.W in the diluent mixture, and at this time, the weight ratio of the HDPE as polyolefin to the diluent mixture is 35:65. This diluent mixture comprises the EBN.W, one of esters of triethyleneglycol, as a diluent and paraffin oil as a supplementary diluent, and it is confirmed that the phase separation temperature increases as the EBN.W content increases. Particularly, when the EBN.W content is 50 to 70 wt %, the phase separation temperatures are 153.9° C., 154.4° C. and 161.4° C. Accordingly, it is confirmed that the stabilized phase separation phenomenon is showed when the EBN.W content is less than 60 wt %. Further, the phase separation temperature was rapidly increased to 227.2° C. when the EBN.W content became 80 wt %, but the phase separation was not observed when the EBN.W content was 40 wt %.

FIG. 4 is a graph showing the liquid-liquid phase separation temperature of a mixture of the HDPE and the BET according to content ratio of BET in the diluent mixture. At this time, the weight ratio of the HDPE as polyolefin to the diluent mixture is 35:65. This diluent mixture comprises the BET, one of esters of trimethylolpropane, as a diluent, and paraffin oil as a supplementary diluent.

When the BET content in the diluent mixture was increased to 60 wt %, 65 wt %, 70 wt %, 80 wt % and 100 wt %, the liquid-liquid phase separation temperatures were 142.2° C., 167.2° C., 187° C., 193.3° C. and 223.9° C., respectively. Namely, it was confirmed that the phase separation temperature was rapidly decreased when the BET content was reduced from 70 wt % to 60 wt %. When the BET content was 50 wt %, the liquid-liquid phase separation was not observed, but only the solid-liquid phase separation was observed.

What is claimed is:

1. A method for preparing a microporous polyolefin film comprising:
   (a) a step of injecting a composition comprising polyolefin 30 to 60 wt % and a diluent mixture 40 to 70 wt % together into an extruding machine, and melting and kneading thereof to prepare a single phase melt, wherein the diluent mixture comprises a diluent, which can make liquid-liquid phase separation with the polyolefin thermodynamically and a supplementary diluent forming a thermodynamic single phase with the polyolefin, and weight ratio of the diluent and the supplementary diluent is 3:7 to 7:3; and
   (b) a step of extruding the melt while conducting liquid-liquid phase separation by passing through a section having the temperature below the liquid-liquid phase separation temperature and forming thereof in the form of a sheet, wherein Hansen solubility parameter distance (Ra), expressed by the following formula of the diluent mixture to the polyolefin is 4.0 to 6.5 $(J/cm^3)^{1/2}$:

$$Ra\ (J/cm^3)^{1/2} = [4*(\delta D^P - \delta D^D)^2 + (\delta P^P - \delta P^D)^2 + (\delta H^P - \delta H^D)^2]^{1/2}$$

wherein $\delta D^P$, $\delta P^P$ and $\delta H^P$ represent polyolefin solubility parameter generated by non-polar dispersion energy, polyolefin solubility parameter generated by polar energy by permanent dipole moment and polyolefin solubility parameter generated by energy by hydrogen bonds, respectively; and $\delta D^D$, $\delta P^D$ and $\delta H^D$ represent diluent solubility parameter generated by non-polar dispersion energy, diluent solubility parameter generated by polar energy by permanent dipole moment and diluent solubility parameter generated by energy by hydrogen bonds, respectively;

stretching the formed sheet to prepare a film;

extracting the diluent and the supplementary diluent from the stretched film by using an organic solvent;

drying the film; and heat-setting the dried film to prepare a microporous polyolefin film, wherein the diluent comprises ester of trimethylolpropane or ester of triethyleneglycol, wherein the supplementary diluent comprises at least one diluent selected from the group consisting of liquid paraffin, paraffin oil, mineral oil and paraffin wax.

2. The method for preparing a microporous polyolefin film according to claim 1, wherein the temperature difference (delta T) between a T-die of the extruding machine and a casting roll when extruding is 120 to 160° C.

3. The method for preparing a microporous polyolefin film according to claim 1, wherein the liquid-liquid phase separation forms uniform pore size by slowly lowering the temperature of the melt (T-die temperature) beyond a filter of the extruding machine to 200° C., and by controlling retention time.

4. The method for preparing a microporous polyolefin film according to claim 2, wherein crystallinity is increased and uniform pore size is formed by lowering the temperature difference (delta T) between the T-die and the casting roll of the extruding machine when extruding.

5. The method for preparing a microporous polyolefin film according to claim 1, which further comprises a step of aging the prepared microporous polyolefin film.

* * * * *